United States Patent
Hwang et al.

(10) Patent No.: US 11,830,633 B2
(45) Date of Patent: Nov. 28, 2023

(54) METHOD FOR DISASSEMBLING HEAVY-WATER REACTOR EQUIPMENT BY USING CUTTING DEVICE

(71) Applicant: KOREA HYDRO & NUCLEAR POWER CO., LTD., Gyeongju-si (KR)

(72) Inventors: Seok-Ju Hwang, Daejeon (KR); Young Hwan Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 289 days.

(21) Appl. No.: 17/430,405

(22) PCT Filed: Feb. 10, 2020

(86) PCT No.: PCT/KR2020/001846
§ 371 (c)(1),
(2) Date: Aug. 12, 2021

(87) PCT Pub. No.: WO2020/166915
PCT Pub. Date: Aug. 20, 2020

(65) Prior Publication Data
US 2022/0148748 A1 May 12, 2022

(30) Foreign Application Priority Data
Feb. 14, 2019 (KR) .......................... 10-2019-0017280

(51) Int. Cl.
*G21D 1/00* (2006.01)
*B26D 1/56* (2006.01)

(52) U.S. Cl.
CPC .............. *G21D 1/003* (2013.01); *B26D 1/56* (2013.01); *B26D 2210/00* (2013.01)

(58) Field of Classification Search
CPC ...... G21D 1/003; B26D 1/56; B26D 2210/00; Y02E 30/00
See application file for complete search history.

(56) References Cited

U.S. PATENT DOCUMENTS 6,599,067 B2 * 7/2003 Scott ..................... G21C 19/207
166/55.7

FOREIGN PATENT DOCUMENTS

| JP | 04-158297 | 6/1992 | |
|---|---|---|---|
| JP | 04158297 A | * 6/1992 | ............. B28D 1/088 |

(Continued)

OTHER PUBLICATIONS

Okane et al.; Method of Disjointing and Removing Nuclear Reactor; Jul. 29, 2004; EPO English Machine Translation, pp. 1-5 (Year: 2023).*

*Primary Examiner* — Bayan Salone
(74) *Attorney, Agent, or Firm* — LEX IP MEISTER, PLLC

(57) ABSTRACT

A method for decommissioning a heavy water reactor facility includes: opening an upper part of the calandria vault; inserting a support device into an inner part of the calandria vault through the upper part of the calandria vault to support the main shell of the calandria; cutting between the main shell and the sub-shell of the calandria by inserting a cutting device into the inner part of the calandria vault through the upper part of the calandria vault; and drawing out the main shell of the calandria to the outside of the calandria vault by moving the support device from the inner part of the calandria vault to the outside through the upper part.

6 Claims, 9 Drawing Sheets

(56) References Cited

FOREIGN PATENT DOCUMENTS

| | | | | |
|---|---|---|---|---|
| JP | 1998-090493 | | 4/1998 | |
| JP | 2787123 | | 8/1998 | |
| JP | 2787123 | B2 * | 8/1998 | ......... B23D 57/0023 |
| JP | 2004-212149 | | 7/2004 | |
| JP | 2004212149 | A * | 7/2004 | |
| JP | 2005-291710 | | 10/2005 | |
| JP | 2005291710 | A * | 10/2005 | |
| JP | 4124643 | | 7/2008 | |
| JP | 4124643 | B2 * | 7/2008 | |
| KR | 10-2015-0075822 | | 7/2015 | |
| KR | 20150075822 | A * | 7/2015 | |
| KR | 2025875 | B1 * | 9/2019 | ............. B21C 13/06 |
| KR | 102025875 | | 9/2019 | |

\* cited by examiner

METHOD FOR DISASSEMBLING HEAVY-WATER REACTOR EQUIPMENT BY USING CUTTING DEVICE

TECHNICAL FIELD

The present disclosure relates to a method for decommissioning a heavy water reactor facility.

BACKGROUND ART

Generally, a heavy water reactor facility among nuclear facilities used for nuclear power generation includes a calandria and a calandria vault for accommodating the calandria therein.

When decommissioning the heavy water reactor facility, it is necessary to first lift and decommission the calandria, a highly radiated structure accommodated inside the calandria vault, to the outside of the calandria vault.

DISCLOSURE

Technical Problem

An embodiment is to provide a method for decommissioning a heavy water reactor facility in which a calandria accommodated in a calandria vault is easily lifted to the outside and decommissioned.

Technical Solution

An embodiment provides a method for decommissioning a heavy water reactor facility that includes a calandria including a main shell and a sub-shell connected to the main shell, and a calandria vault supporting the sub-shell of the calandria to accommodate the calandria therein, including: opening an upper part of the calandria vault; inserting a support device into an inner part of the calandria vault through the upper part of the calandria vault to support the main shell of the calandria; cutting between the main shell and the sub-shell of the calandria by inserting a cutting device into the inner part of the calandria vault through the upper part of the calandria vault; and drawing out the main shell of the calandria to the outside of the calandria vault by moving the support device from the inner part of the calandria vault to the outside through the upper part.

The heavy water reactor facility may further include a reactivity mechanism deck that is supported on the upper part of the calandria vault and covers the calandria, and the opening of the upper part of the calandria vault may include separating the reactivity mechanism deck from the calandria vault.

The opening of the upper part of the calandria vault may further include expanding the upper part of the calandria vault.

The support device may include: two first vertical moving rails spaced apart from each other with the calandria interposed therebetween; and a first opening/closing type of fixing ring that is supported by the first vertical moving rails to move up and down, and the first opening/closing type of fixing ring may selectively form a U-shape or O-shape.

The supporting of the main shell of the calandria may include: inserting the first opening/closing type of fixing ring into the inner part of the calandria vault in the U-shape having an opened lower side along the first vertical moving rails; and surrounding and supporting the main shell of the calandria with the first opening/closing type of fixing ring of the O-shape.

The cutting device may include: two second vertical moving rails spaced apart from each other with the calandria interposed therebetween; a second opening/closing type of fixing ring that is supported by the second vertical moving rails to move up and down; and a cutting part supported on the second opening/closing type of fixing ring to move along the second opening/closing type of fixing ring, and the second opening/closing type of fixing ring may selectively form a U-shape or O-shape.

The cutting between the main shell and the sub-shell of the calandria may include: inserting the second opening/closing type of fixing ring into the inner part of the calandria vault in the U-shape having an opened lower side along the second vertical moving rails; surrounding between the main shell and the sub-shell of the calandria with the second opening/closing type of fixing ring of the O-shape; and moving the cutting part along the second opening/closing type of fixing ring to cut between the main shell and the sub-shell of the calandria.

Advantageous Effects

According to the embodiment, a method for decommissioning a heavy water reactor facility in which a calandria accommodated in a calandria vault is easily lifted to the outside and decommissioned, is provided.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present embodiment.

In addition, unless explicitly described to the contrary, the word "comprise" and variations such as "comprises" or "comprising" will be understood to imply the inclusion of stated elements but not the exclusion of any other elements.

Hereinafter, a method for decommissioning a heavy water reactor facility according to an embodiment will be described with reference to FIG. 1 to FIG. 9.

Hereinafter, a CANDU type of heavy water reactor facility including a calandria is exemplarily described as a heavy water reactor facility, but the heavy water reactor facility is not limited thereto.

Figure 1:
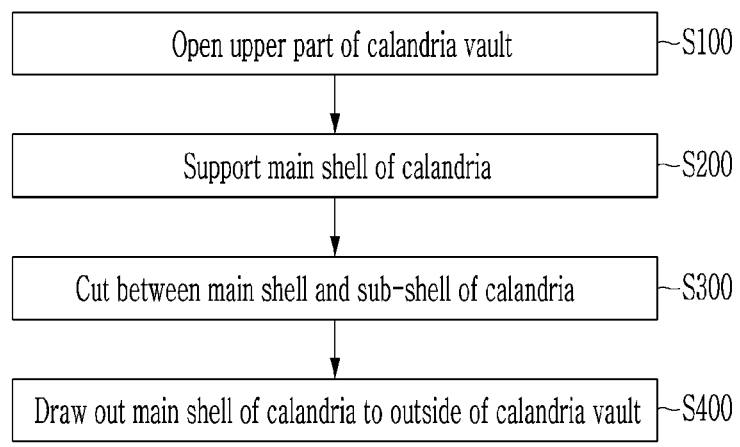
FIG. 1 illustrates a flowchart of a method for decommissioning a heavy water reactor facility according to an embodiment.
Figure 2:
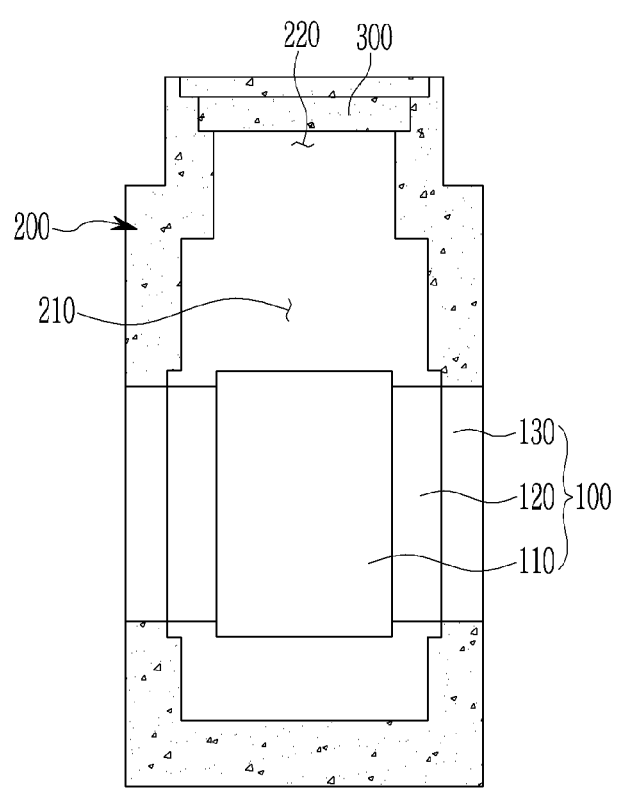
FIG. 2 illustrates a cross-sectional view of some of a heavy water reactor facility.
Figure 3:
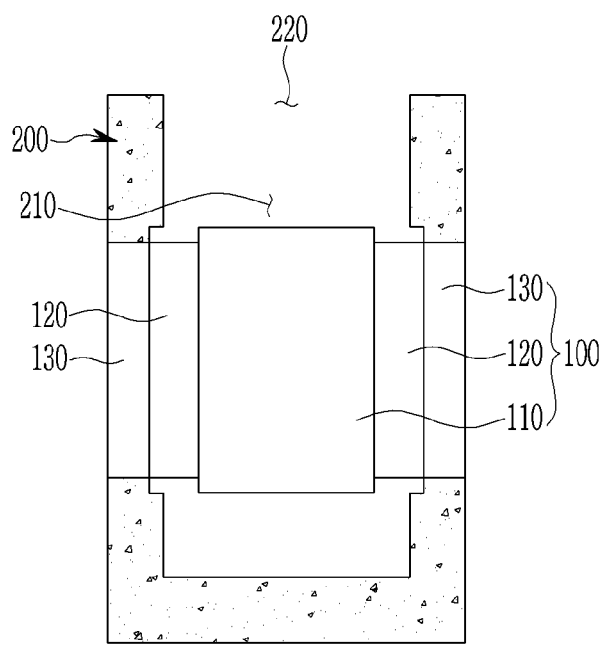
FIG. 3 illustrates a cross-sectional view of a structure in which an upper part of a calandria vault is opened in the heavy water reactor facility illustrated in FIG. 2.

FIG. 1 illustrates a flowchart of a method for decommissioning a heavy water reactor facility according to an embodiment. FIG. 2 illustrates a cross-sectional view of some of a heavy water reactor facility. FIG. 3 illustrates a cross-sectional view of a structure in which an upper part of a calandria vault is opened in the heavy water reactor facility illustrated in FIG. 2.

First, referring to FIG. 1 to FIG. 3, an upper part 220 of a calandria vault 200 is opened (S100).

Specifically, referring to FIG. 2, the heavy water reactor facility includes a calandria 100 that includes a main shell 110 positioned in a center, sub-shells 120 connected to both ends of the main shell 110, and end shields 130 for shielding ends of the sub-shells 120, a calandria vault 200 for supporting the sub-shell 120 of the calandria 100 to accommodate the calandria 100 in an inner part 210 thereof, and a reactivity mechanism deck 300 supported on an upper part 220 of the calandria vault 200 and positioned on the calandria 100 to cover the calandria 100.

The sub-shells 120 of the calandria 100 are supported by the calandria vault 200. The sub-shells 120 may be supported by the calandria vault 200 in a state of being connected to the end shield 130, but are not limited thereto.

On the other hand, in the heavy water reactor facility shown in FIG. 2, pipes such as a known pressure tube connected to a known inner structure positioned inside the calandria 100 and to the calandria 100 and a calandria tube are separated from the calandria 100, and a control device and guide tubes such as known control rods and absorption rods connected to the calandria 100 through the reactivity mechanism deck 300 are separated from the calandria 100.

Referring to FIG. 2 and FIG. 3, in order to open the upper part 220 of the calandria vault 200, the reactivity mechanism deck 300 is separated from the calandria vault 200. Then, the upper part 220 of the calandria vault 200 is expanded. An opening area of the upper part 220 of the calandria vault 200 from which the reactivity mechanism deck 300 is separated by using a cutting member such as a wire saw may be expanded.

As the upper part 220 of the calandria vault 200 is expanded, a support device and a cutting device to be described later may be easily inserted into the inner part 210 of the calandria vault 200, and the calandria 100 may be easily drawn out from the inner part 210 of the calandria vault 200.

Figure 4:
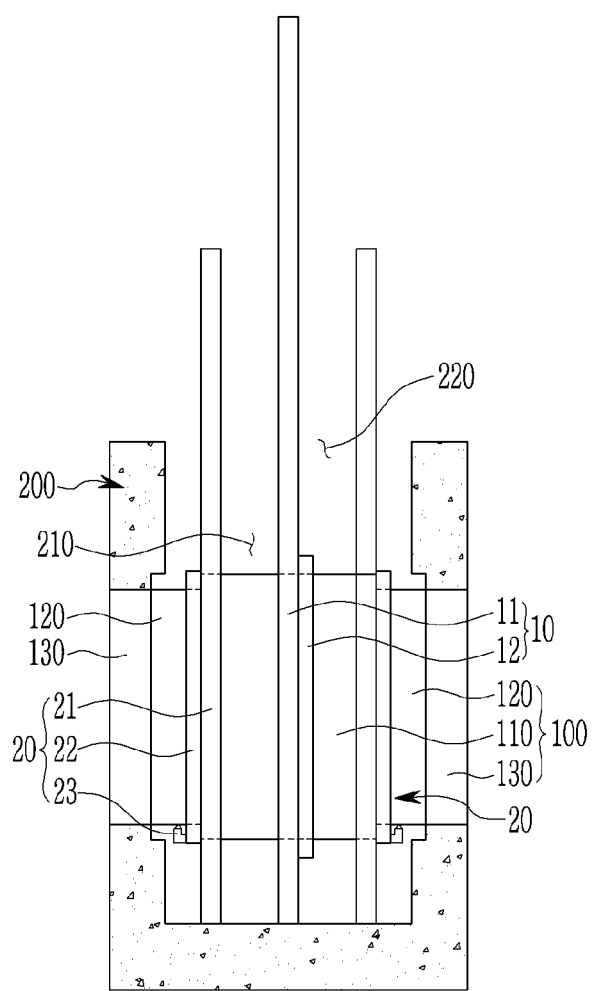
FIG. 4 illustrates a cross-sectional view of a structure in which a support device and a cutting device are installed in the heavy water reactor facility illustrated in FIG. 3.

FIG. 4 illustrates a cross-sectional view of a structure in which a support device and a cutting device are installed in the heavy water reactor facility illustrated in FIG. 3.

Next, referring to FIG. 4, the main shell 110 of the calandria 100 is supported (S200).

Specifically, the main shell 110 of the calandria 100 is supported by inserting the support device 10 into the inner part 210 of the calandria vault 200 through the expanded upper part 220 of the calandria vault 200.

Figure 5:
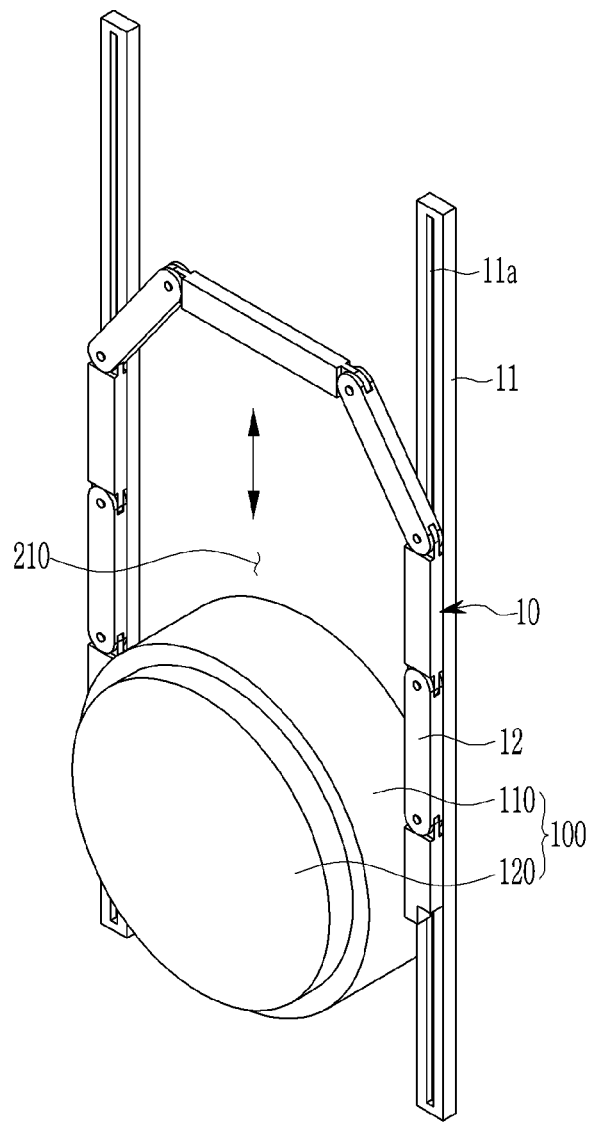
FIG. 5 and FIG. 6 are drawings for explaining the support device illustrated in FIG. 4.
Figure 6:
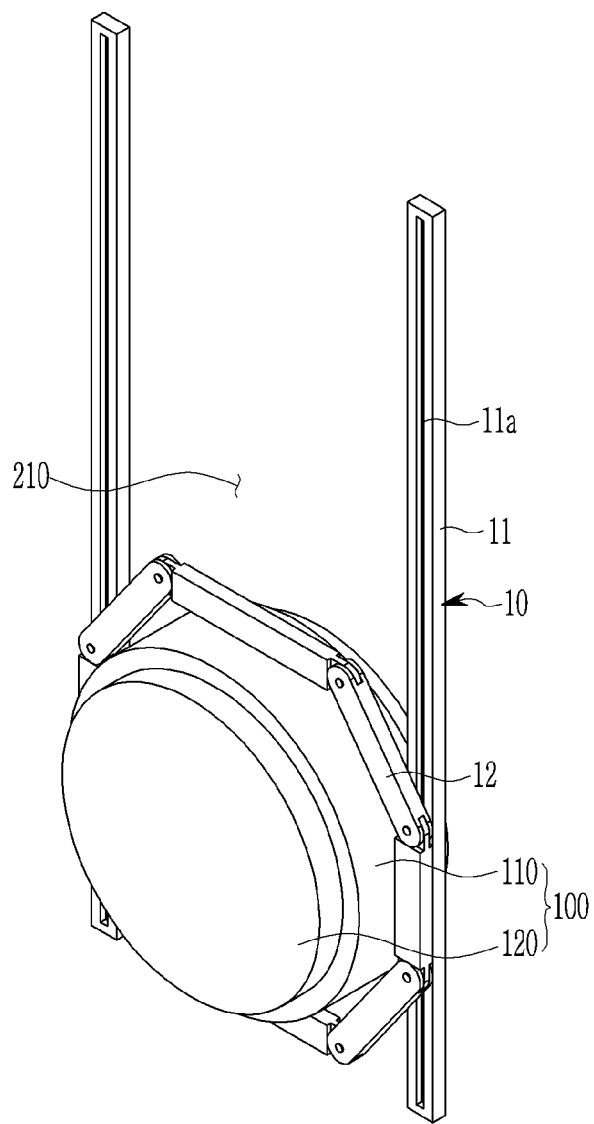

FIG. 5 and FIG. 6 are drawings for explaining the support device illustrated in FIG. 4.

Referring to FIG. 4 to FIG. 6, the support device 10 includes two first vertical moving rails 11 and a first opening/closing fixing ring 12.

The two first vertical moving rails 11 are inserted into the calandria vault 200 so as to be spaced apart from each other with the main shell 110 of the calandria 100 interposed therebetween. The first vertical moving rail 11 includes a first rail 11a that guides vertical movement of the first opening/closing fixing ring 12.

The first opening/closing fixing ring 12 is supported by the first vertical moving rail 11 to move up and down along the first rail 11a. The first opening/closing fixing ring 12 may support the main shell 110 of the calandria 100 by selectively forming a reverse U-shape or O-shape. The first opening/closing fixing ring 12 may include multi-joint arms, but is not limited thereto. The multi-joint arms of the first opening/closing type of fixing ring 12 are supported on the first vertical moving rail 11 to move up and down along the first rail 11a while selectively forming a U-shape or an O-shape.

The support device 10 may further include a driving part for forming the U-shape or O-shape of the first opening/closing type of fixing ring 12 and vertically moving the first opening/closing type of fixing ring 12. The driving part may include various known components for driving the first opening/closing type of fixing ring 12.

Meanwhile, in another embodiment, the support device 10 may include various known components as long as it is inserted into the inner part 210 of the calandria vault 200 to support the main shell 110 of the calandria 100.

In order to support the main shell 110 of the calandria 100, the first opening/closing type of fixing ring 12 is formed to have an inverted U-shape with an opened lower side along the first vertical moving rails 11 and inserted into the inner part 210 of the calandria vault 200. Then, the first opening/closing type of fixing ring 12 is formed to have an O-shape to surround and support the main shell 110 of the calandria 100.

Next, referring to FIG. 4, a cut is made between the main shell 110 and the sub-shell 120 of the calandria 100 (S300).

Specifically, a cutting device 20 is inserted into the inner part 210 of the calandria vault 200 through the upper part 220 of the calandria vault 200 to cut between the main shell 110 and the sub-shell 120 of the calandria 100. Two cutting devices 20 are provided, and each of the two cutting devices 20 cuts between the two neighboring main shell 110 and the sub-shell 120 with the center of the main shell 110 interposed therebetween.

Figure 7:
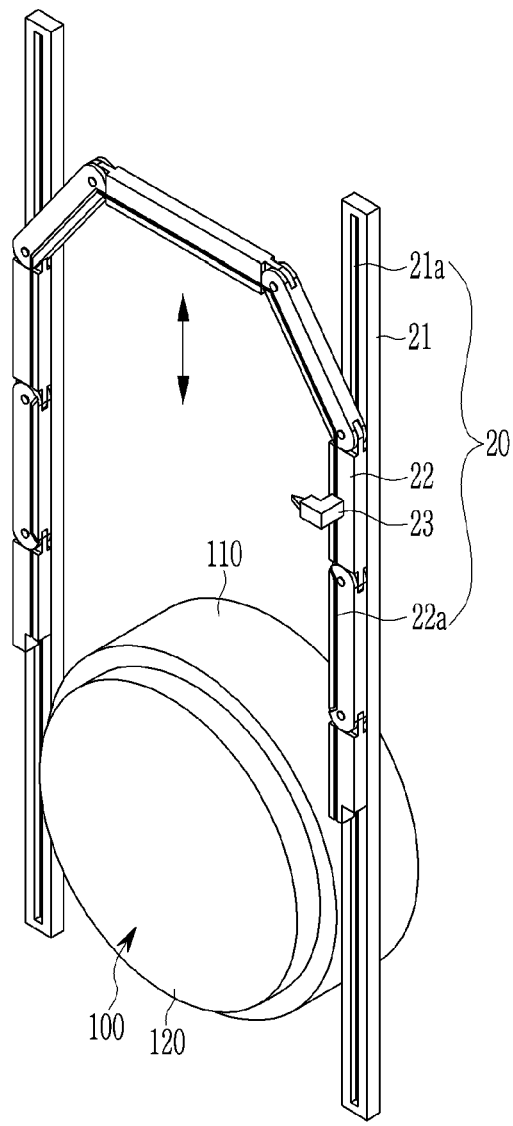
FIG. 7 and FIG. 8 are drawings for explaining the cutting device illustrated in FIG. 4.
Figure 8:
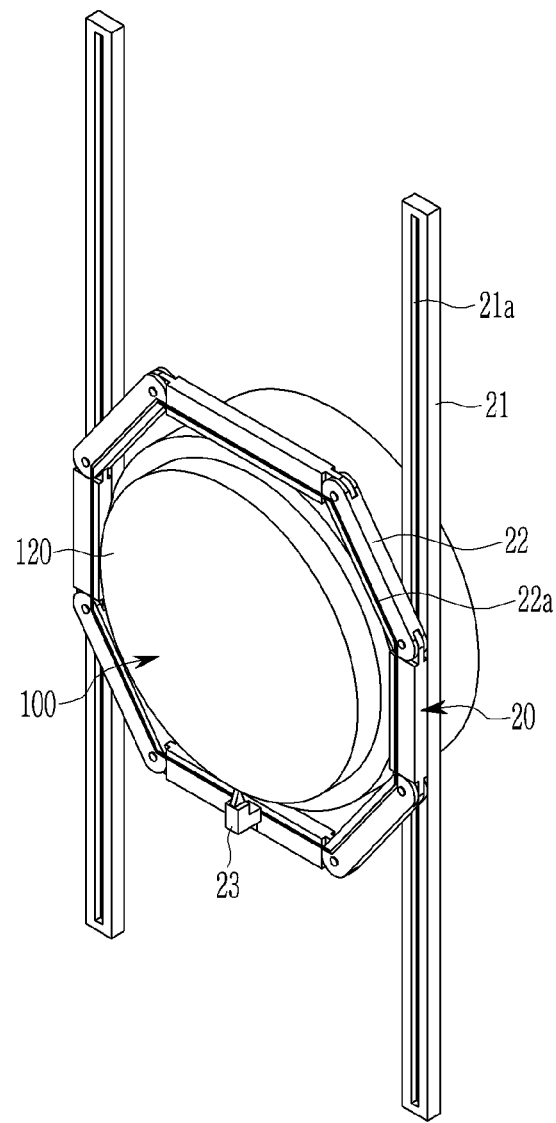

FIG. 7 and FIG. 8 are drawings for explaining the cutting device illustrated in FIG. 4.

Referring to FIG. 4, FIG. 7, and FIG. 8, the cutting device 20 includes two second vertical moving rails 21, a second opening/closing type of fixing ring 22, and a cutting part 23.

The two second vertical moving rails 21 are inserted into the calandria vault 200 so as to be spaced apart from each other with the main shell 110 and the sub-shell 120 of the calandria 100 interposed therebetween. The second vertical moving rail 21 includes a second rail 21a that guides vertical movement of the second opening/closing fixing ring 22.

The second opening/closing type of fixing ring 22 is supported by the second vertical moving rail 21 to move up and down along the second rail 21a. The second opening/closing type of fixing ring 22 may selectively form a reverse U-shape or O-shape to surround between the main shell 110 and the sub-shell 120 of the calandria 100. The second opening/closing type of fixing ring 22 may include multi-joint arms, but is not limited thereto. The multi-joint arms of the second opening/closing type of fixing ring 22 are supported on the second vertical moving rail 21 to move up and down along the second rail 21a while selectively forming a U-shape or an O-shape. The second opening/closing type of fixing ring 22 includes a third rail 22a that guides movement of the cutting part 23.

The cutting part 23 is supported by the second opening/closing type of fixing ring 22 to move along the third rail 22a. The cutting part 23 moves along the third rail 22a of the second opening/closing type of fixing ring 22 surrounding between the main shell 110 and the sub-shell 120 of the calandria 100 to cut between the main shell 110 and the sub-shell 120 of the calandria 100. Here, an area between the main shell 110 and the sub-shell 120 of the calandria 100 may be a portion of the sub-shell 120, but is not limited thereto. The cutting part 23 may include a cutting member including an oscillator for irradiating a laser beam, but is not limited thereto, and it may include a cutting member such as a rotation saw.

The cutting device 20 may further includes a driving part for the formation of the U-shape or O-shape of the second opening/closing type of fixing ring 22, for the vertical movement of the second opening/closing type of fixing ring 22, and for the movement of the cutting part 23 along the second opening/closing type of fixing ring 22. The driving part may include various known components for driving the second opening/closing type of fixing ring 22 and the cutting part 23.

Meanwhile, in another embodiment, the cutting device 20 may include various known components as long as it is inserted into the inner part 210 of the calandria vault 200 to cut between the main shell 110 and the sub-shell 120 of the calandria 100.

In order to cut between the main shell 110 and the sub-shell 120 of the calandria 100, the second opening/closing type of fixing ring 22 is formed to have an inverted U-shape with an opened lower side along the second vertical moving rails 21 and inserted into the inner part 210 of the calandria vault 200. Then, the second opening/closing type of fixing ring 22 is formed to have an O-shape to surround between the main shell 110 and the sub-shell 120 of the calandria 100. Then, the cutting part 23 is moved along the second opening/closing type of fixing ring 22 to cut between the main shell 110 and the sub-shell 120 of the calandria 100.

When cutting between the main shell 110 and the sub-shell 120 of the calandria 100 by using the cutting device 20, since the support device 10 supports the main shell 110 of the calandria 100, the cutting operation is easily performed.

Figure 9:
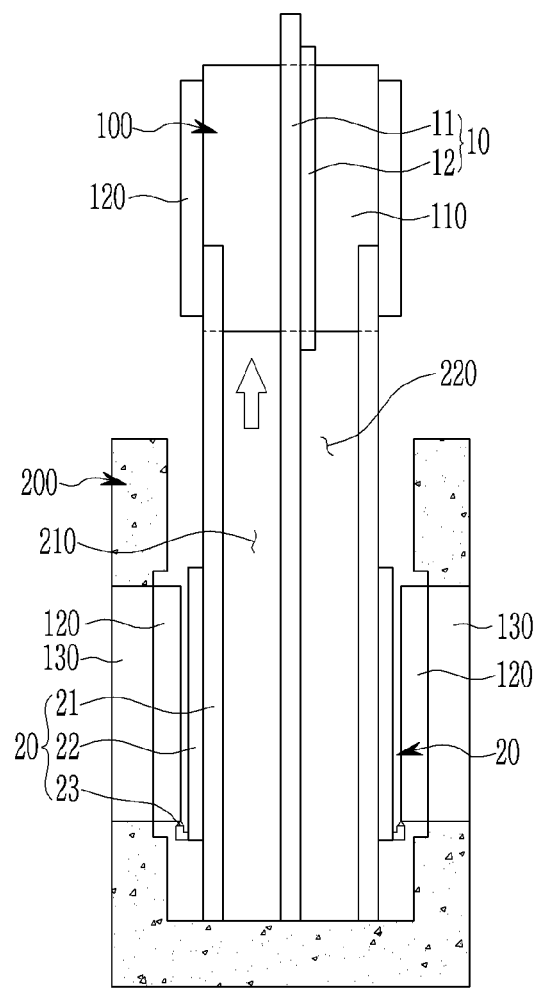
FIG. 9 illustrates a cross-sectional view of a state in which a calandria in which a cut is made between a main shell and a sub-shell by using the cutting device in the heavy water reactor facility illustrated in FIG. 4 is drawn out to the outside of the calandria vault by using the support device.

FIG. 9 illustrates a cross-sectional view of a state in which a calandria in which a cut is made between a main shell and a sub-shell by using the cutting device in the heavy water reactor facility illustrated in FIG. 4 is drawn out to the outside of the calandria vault by using the support device.

Next, referring to FIG. 9, the main shell 110 of the calandria 100 is drawn out to the outside of the calandria vault 200 (S400).

Specifically, by moving the support device 10 from the inner part 210 of the calandria vault 200 to the outside through the upper part 220 thereof, the main shell 110 of the calandria 100 cut from the sub-shell 120 supported by the calandria vault 200 is drawn out to the outside of the calandria vault 200.

For the drawing out of the main shell 110 of the calandria 100, the first opening/closing type of fixing ring 12 supporting the main shell 110 of the calandria 100 by forming an O-shape in the inner part 210 of the calandria vault 200 is moved from the inner part 210 of the calandria vault 200 to the outside through the upper part 220 thereof along the first vertical moving rails 11.

Next, the main shell 110 of the calandria vault 200 drawn out to the outside of the calandria vault 200 may be cut and decommissioned.

As described above, according to the method for decommissioning the heavy water reactor facility according to the embodiment, when decommissioning the heavy water reactor facility, by using the support device 10 and the cutting device 20, the calandria 100, which is a highly-radiative structure accommodated in the calandria vault 200, may be preferentially lifted to the outside of the calandria vault 200, and then may be decommissioned.

That is, the method for decommissioning the heavy water reactor facility is provided, in which the calandria 100 accommodated in the calandria vault 200 is easily lifted to the outside and decommissioned.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS calandria 100, main shell 110, sub-shell 120, end shield 130, calandria vault 200, support device 10, cutting device 20

The invention claimed is:

1. A method for decommissioning a heavy water reactor facility that includes a calandria including a main shell and a sub-shell connected to the main shell, and a calandria vault supporting the sub-shell of the calandria to accommodate the calandria therein, comprising:
   opening an upper part of the calandria vault;
   inserting a support device into an inner part of the calandria vault through the upper part of the calandria vault to support the main shell of the calandria;
   cutting between the main shell and the sub-shell of the calandria by inserting a cutting device into the inner part of the calandria vault through the upper part of the calandria vault; and
   drawing out the main shell of the calandria to the outside of the calandria vault by moving the support device from the inner part of the calandria vault to the outside through the upper part,
   wherein
   the support device includes:
   two first vertical moving rails spaced apart from each other with the calandria interposed therebetween; and
   a first opening/closing type of fixing ring that is supported by the first vertical moving rails to move up and down, and
   the first opening/closing type of fixing ring selectively forms a U-shape or O-shape.

2. The method for decommissioning the heavy water reactor facility of claim 1, wherein
   the heavy water reactor facility further includes a reactivity mechanism deck that is supported on the upper part of the calandria vault and covers the calandria, and
   the opening of the upper part of the calandria vault includes separating the reactivity mechanism deck from the calandria vault.

3. The method for decommissioning the heavy water reactor facility of claim 2, wherein the opening of the upper part of the calandria vault further includes expanding the upper part of the calandria vault.

4. The method for decommissioning the heavy water reactor facility of claim 1, wherein
the supporting of the main shell of the calandria includes:
inserting the first opening/closing type of fixing ring into the inner part of the calandria vault in the U-shape having an opened lower side along the first vertical moving rails; and
surrounding and supporting the main shell of the calandria with the first opening/closing type of fixing ring of the O-shape.

5. The method for decommissioning the heavy water reactor facility of claim 1, wherein
the cutting device includes:
two second vertical moving rails spaced apart from each other with the calandria interposed therebetween;
a second opening/closing type of fixing ring that is supported by the second vertical moving rails to move up and down; and
a cutting part supported on the second opening/closing type of fixing ring to move along the second opening/closing type of fixing ring, and
the second opening/closing type of fixing ring selectively forms a U-shape or O-shape.

6. The method for decommissioning the heavy water reactor facility of claim 5, wherein
the cutting between the main shell and the sub-shell of the calandria includes:
inserting the second opening/closing type of fixing ring into the inner part of the calandria vault in the U-shape having an opened lower side along the second vertical moving rails;
surrounding between the main shell and the sub-shell of the calandria with the second opening/closing type of fixing ring of the O-shape; and
moving the cutting part along the second opening/closing type of fixing ring to cut between the main shell and the sub-shell of the calandria.

\* \* \* \* \*